(12) United States Patent
Fey et al.

(10) Patent No.: US 6,817,681 B2
(45) Date of Patent: Nov. 16, 2004

(54) ELECTROHYDRAULIC BRAKE SYSTEM FOR MOTOR VEHICLES

(75) Inventors: Wolfgang Fey, Niedernhausen (DE); Georg Fachinger, Limburg (DE); Mario Engelmann, Steinbach/Ts. (DE); Andreas Klein, Bad Homburg (DE); Peter Schubert, Weisbaden (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/311,842

(22) PCT Filed: Jun. 13, 2001

(86) PCT No.: PCT/EP01/06700

§ 371 (c)(1),
(2), (4) Date: Dec. 18, 2002

(87) PCT Pub. No.: WO01/98122

PCT Pub. Date: Dec. 27, 2001

(65) Prior Publication Data

US 2003/0222497 A1 Dec. 4, 2003

(30) Foreign Application Priority Data

Jun. 20, 2000 (DE) .......................................... 100 31 010

(51) Int. Cl.[7] .............................................. B60T 8/34
(52) U.S. Cl. ............................... 303/113.4; 303/122.05; 303/199; 303/3
(58) Field of Search ............................... 303/3, 15, 20, 303/155, 122.04, 122.05, 199, 113.1, 113.4, 162

(56) References Cited

U.S. PATENT DOCUMENTS

| | | | | |
|---|---|---|---|---|
| 3,829,668 A | * | 8/1974 | Noumi et al. ................. | 714/48 |
| 4,745,542 A | * | 5/1988 | Baba et al. ............. | 303/122.04 |
| 5,887,954 A | * | 3/1999 | Steiner et al. ............ | 303/113.4 |
| 5,941,608 A | * | 8/1999 | Campau et al. .......... | 303/113.4 |
| 6,398,319 B1 | * | 6/2002 | Wilson et al. .......... | 303/122.05 |
| 6,582,030 B2 | * | 6/2003 | Harris ............................ | 303/3 |

FOREIGN PATENT DOCUMENTS

| | | |
|---|---|---|
| DE | 19502925 | 8/1996 |
| DE | 19843220 | 8/1999 |
| EP | 2349676 | 11/2000 |

OTHER PUBLICATIONS

Jonner et al., Electrohydraulic Brake System—The First Approach to Brake–By–Wire Technology, SAE Technical Paper Series 960991, pp. 105–112.*

* cited by examiner

Primary Examiner—Thomas Williams
(74) Attorney, Agent, or Firm—Honigman Miller Schwartz & Cohn LLP

(57) ABSTRACT

The present invention relates to an electro-hydraulic brake system for motor vehicles which is controllable in a 'brake-by-wire' operating mode by the vehicle operator as well as independently of the vehicle operator, and which can be operated in a back-up operational mode where only operation by the vehicle operator is possible. The brake system includes an emergency pressure generator or master brake cylinder which has at least one pressure chamber and is operable by way of a brake pedal, and a hydraulic auxiliary pressure source whose pressure is used to act upon wheel brakes that are connectable to the master brake cylinder by way of at least one hydraulic connection closable by a separating valve, as well as an electronic control and regulating unit. In order to achieve a very rapid change-over of the separating valves into the closing position, the present invention arranges for an additional electric circuit that actuates the separating valve independently of the electronic control and regulating unit as the driver's deceleration demand occurs.

7 Claims, 2 Drawing Sheets

ELECTROHYDRAULIC BRAKE SYSTEM FOR MOTOR VEHICLES

TECHNICAL FIELD

The present invention generally relates to vehicle brake systems and more particularly relates to an electro-hydraulic brake system for motor vehicles.

BACKGROUND OF THE INVENTION

An electro-hydraulic brake system of this general type is e.g. disclosed in the article 'Das elektro-hydraulische Bremssystem von Continental Teves—eine neue Herausforderung für die System—und Methodenentwicklung in der Serie' ('The electro-hydraulic brake system of Continental Teves—a new challenge for the series development of systems and methods'), VDI Berichte No. 1547, 2000. On application of the brake pedal, the separating valves in the prior-art brake system are switched to assume their closed position on command of control signals generated by the electronic control and regulating unit. When the control or system electronics should fail, the travel simulator is blocked mechanically by one of the master cylinder pistons moving so that the travel simulator cannot receive pressure fluid volume in the event of actuation of the master brake cylinder in the emergency braking mode.

The time from the commencement of actuation of the master cylinder initiated by the driver until closing of the separating valves is problematic in the electro-hydraulic brake system of the state of the art. When the master cylinder actuation is too quick, the master cylinder piston blocking the travel simulator may move too far before the separating valves are closed. One consequence would be a 'hard' brake pedal what could irritate the driver, and another one that only a pressure sensor could still sense the extent of the deceleration demand.

BRIEF SUMMARY OF THE INVENTION

An object of the present invention is to disclose an electro-hydraulic brake system of the type mentioned hereinabove permitting a very rapid change-over of the separating valves into the closed position.

This object is achieved according to the present invention by providing an additional electric circuit, which actuates the separating valve independently of the electronic control and regulating unit as the driver's deceleration demand occurs. The reaction time of the electronic circuit is then considerably shorter than that of the electronic control and regulating unit. These measures achieve another advantage that is directed to the condition in which the electro-hydraulic brake system is not yet initialized (e.g. by switching on the ignition, door contact, remote control) but when the driver applies the brake pedal.

To render the idea of the present invention more specific, the electric circuit is arranged for to have an evaluating circuit for detecting the driver's deceleration demand that serves to enable the actuation plus the actuation of the separating valve.

According to a favorable aspect of the subject matter of the present invention, a timer is connected downstream of the evaluating circuit to generate an actuating signal for the separating valve and suppress the actuation of the separating valve upon expiry of a predetermined duration. It is achieved by this measure that the separating valve is disconnected after a preset time, thereby avoiding a safety-critical performance in case the system does not function properly.

A second safety function may be implemented in that a hardware monitoring circuit (watchdog) is connected downstream of the electronic control and regulating unit, said monitoring circuit suppressing the actuation of the separating valve in the event of a dynamic status signal produced by the electronic control and regulating unit differing from a status signal produced by the hardware monitoring circuit (watchdog).

In this arrangement, the above-mentioned actuation of the separating valve is effected by means of two actuation logic circuits being associated with a safety switch and a separating valve driver connected in series with the separating valve.

DETAILED DESCRIPTION OF THE PREFERRED EMBODIMENTS

Figure 1:
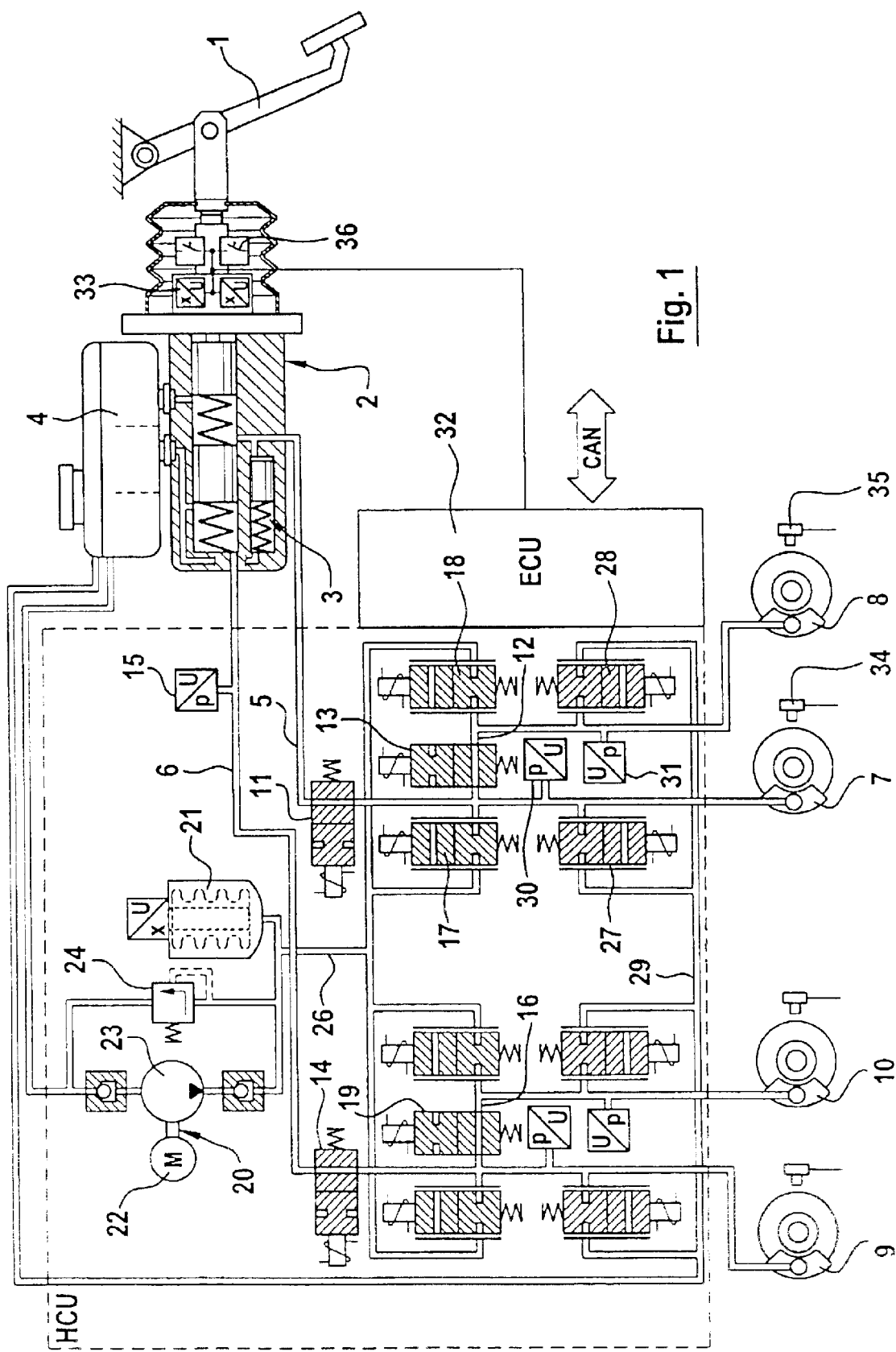
FIG. 1 is a simplified circuit diagram of an electro-hydraulic brake system of the invention.

The electro-hydraulic brake system illustrated in FIG. 1 comprises a dual-circuit master brake cylinder or, respectively, tandem master cylinder 2 that is operable by means of an actuating pedal 1 and cooperates with a pedal travel simulator 3, said master cylinder comprising two pressure chambers separated by means of two master cylinder pistons and being in connection with an unpressurized pressure fluid supply reservoir 4. A connection between the travel simulator 3 and the pressure fluid supply reservoir 4 is shut off by means of a valve device (not shown) as the second master cylinder piston (not referred to) is moving.

Wheel brakes 7, 8 e.g. associated with the front axle are connected to the first pressure chamber (primary pressure chamber) by means of a closable first hydraulic line 5. Line 5 is shut off by means of a first separating valve 11, while an electromagnetically operable, preferably normally open (NO) pressure-compensating valve 13 is inserted into a line portion 12 connected between the wheel brakes 7, 8, said valve permitting a braking pressure control on each individual wheel, if required.

The second pressure chamber of the master brake cylinder 2 to which a pressure sensor 15 may be connected is connectable with the other pair of wheel brakes 9, 10 associated with the rear axle by way of a second hydraulic line 6 closable by means of a second separating valve 14. In turn, an electromagnetically operable, preferably normally open (NO) pressure-compensating valve 19 is inserted into a line portion 16 disposed between the wheel brakes 9, 10. As the design of the hydraulic circuit connected to the second pressure chamber of the master brake cylinder 2 is identical to that one of the brake circuit 11 that is explained in the preceding description, it need not be discussed in the following text.

As can further be taken from the drawing, there is provision of a motor-and-pump assembly 20 used as an independent pressure source and including a high-pressure accumulator 21, said assembly being in turn comprised of a pump 23 driven by means of an electric motor 22 and a pressure-limiting valve 24 connected in parallel to pump 23. The suction side of the pump 23 is connected to the above-mentioned pressure fluid supply reservoir 4 by way of a non-return valve 24. A pressure sensor (not shown) can monitor the hydraulic pressure generated by pump 23.

A third hydraulic line 26 connects the high-pressure accumulator 21 to the inlet ports of two electromagnetic, normally closed two-way/two-position directional control valves 17, 18 of analog operation which, in their capacity as inlet valves, are connected upstream of the wheel brakes 7 and 8. Besides, the wheel brakes 7, 8 are connected to a fourth hydraulic line 29 by way of each one electromagnetic, normally closed two-way/two-position directional control valve or outlet valve 27, 28 of analog operation, said line 29 being in connection to the unpressurized pressure fluid supply reservoir 4, on the other hand. The hydraulic pressure prevailing in the wheel brakes 7, 8 is determined by means of each one pressure sensor 30, 31.

An electronic control and regulating unit (ECU) 32 is used to jointly actuate the motor-and-pump assembly 20 and the electromagnetic valves 11, 13, 14, 17, 18, 19, 27, 28, with the output signals of an actuating travel sensor 33 cooperating with the actuating pedal 1 and of the above-mentioned pressure sensor 15 being sent to the ECU as input signals, thereby rendering a detection of the driver's deceleration demand possible. However, other means, for example a force sensor sensing the actuating force on the actuating pedal 1, can also be used to detect the driver's deceleration demand. As further input quantities, the output signals of the pressure sensors 30, 31 and of wheel speed sensors (shown only schematically) are sent to the electronic control and regulating unit (ECU) 32, with reference numerals 34, 35 being assigned to said wheel speed sensors associated with wheel brakes 7, 8. Moreover, the control and regulating unit (ECU) 32 receives signals from an additional electric circuit 36 which serves for a rapid actuation of the separating valves 11, 14 independently of the control and regulating unit (ECU) 32.

Figure 2:
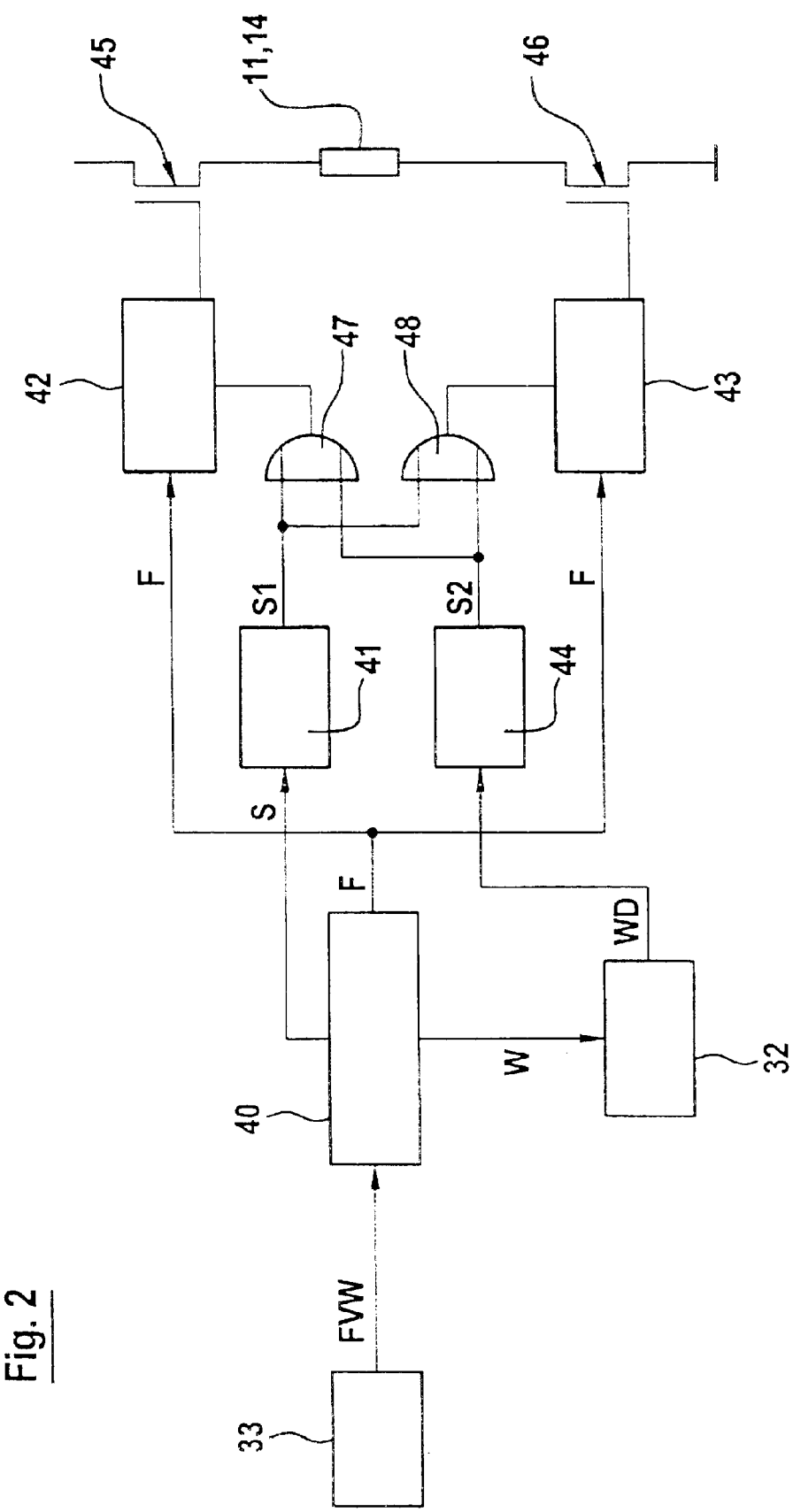
FIG. 2 is a simplified circuit diagram of the electric circuit of the present invention for actuating the separating valves.

The layout of the electric circuit 36 mentioned with respect to FIG. 1 becomes apparent from FIG. 2. It can be seen in the circuit diagram illustrated therein that the signal FVW of the actuating travel sensor 33 representative of the driver's deceleration demand is sent to an evaluating circuit 40 which generates a start signal S for activating a timer 41, an enabling signal F for a first actuating logic circuit 42 and a second actuating logic circuit 43 as well as a wake signal W for the 'wake-up' of the control and regulating unit (ECU) 32. The first actuating logic circuit 42 is assigned to a safety switch 45, while the second actuating logic circuit 43 is used to actuate a separating valve driver 46, with both the safety switch 45 and the separating valve driver 46 being connected in series with the coil of the corresponding separating valve 11, 14 being actuated. The timer 41 containing an invariable time allowance is used to set a time limit for the activation of the actuating logic circuits 42, 43 in such a way that it produces a disabling signal S1 for deactivating the actuating logic circuits 42, 43 upon expiry of the predetermined time. The electronic control and regulating unit 32 will then take care of actuating the separating valves 11, 14.

Should the timer 41 be defective, a second safety function is necessary which deactivates the separating valves 11, 14 again in the case of a faulty function of the system. A second or rather redundant timer may e.g. safeguard the second safety function. Another solution resides in using a hardware monitoring circuit (watchdog) 44 connected downstream of the control and regulating unit (ECU) 32. A dynamic status signal WD generated by the control and regulating unit (ECU) 32 is sent to the hardware monitoring circuit (watchdog) 44, said signal containing data about the status of the control and regulating unit (ECU) 32 and being compared in terms of time and value in the hardware monitoring circuit (watchdog) 44 with the internally produced status signal. If the mentioned status signals do not correlate, the hardware monitoring circuit (watchdog) 44 will generate a second disabling signal S2 for deactivating the actuating logic circuits 42, 43. The two disabling signals S1, S2 are preferably sent as input signals to a pair of logic OR gates 47, 48 having output signals which disable the actuating logic circuits 42, 43.

According to the embodiment described hereinabove, the separating valves 11, 14 of the two hydraulic circuits are actuated by way of the actuating circuit for defined reasons. It would principally be sufficient to actuate only the separating valve 14 leading from the secondary pressure chamber to the wheel brakes 9, 10.

What is claimed is:

1. Electro-hydraulic brake system for motor vehicles which is controllable in a 'brake-by-wire' operating mode by the vehicle operator as well as independently of the vehicle operator, and which can be operated in a back-up operational mode where only operation by the vehicle operator is possible, comprising;

a device for detecting the driver's deceleration demand, an emergency pressure generator or, respectively, master brake cylinder that is operable by means of a brake pedal and has at least one pressure chamber, a travel simulator that cooperates with the master brake cylinder and can be disconnected by actuation of the master brake cylinder, a hydraulic auxiliary pressure source whose pressure is used to act upon wheel brakes that are connectable to the master brake cylinder by way of at least one hydraulic connection closable by means of a separating valve, an electronic control and regulating unit, an electric circuit for actuating the separating valve independently of the electronic control and regulating unit as a function of the driver's deceleration demand, wherein a reaction time of the electric circuit is considerably shorter than a reaction time of the electronic control and regulating unit.

2. Electro-hydraulic brake system as claimed in 1, wherein the electric circuit includes an evaluating circuit for detecting the driver's deceleration demand that serves to enable the actuation of the separating valve.

3. Electro-hydraulic brake system as claimed in claim 2, further including a timer circuit connected to the evaluating circuit, said tinier circuit effective for disabling the actuation of the separating valve upon expiry of a predetermined duration.

4. Electro-hydraulic brake system as claimed in claim 2, further including a hardware monitoring circuit connected downstream of the electronic control and regulating unit, whereby said monitoring circuit disables the actuation of the separating valve in the event that the electronic control and regulating unit produces a dynamic status signal signal which differs from a status signal produced by the hardware monitoring circuit.

5. Electro-hydraulic brake system as claimed in claim 1, further including two actuation logic circuits are coupled to said separating valve, wherein said two actuating logic circuits are associated with a safety switch and a separating valve driver connected in series with the separating valve.

6. Electro-hydraulic brake system for motor vehicles which is controllable in a 'brake-by-wire' operating mode by the vehicle operator as well as independently of the vehicle operator, and which can be operated in a back-up operational mode where only operation by the vehicle operator is possible, comprising:

a device for detecting the driver's deceleration demand, an emergency pressure generator or, respectively, master brake cylinder that is operable by means of a brake pedal and has at least one pressure chamber, a travel simulator that cooperates with the master brake cylinder and can be disconnected by actuation of the master brake cylinder, a hydraulic auxiliary pressure source whose pressure is used to act upon wheel brakes that are connectable to the master brake cylinder by way of at least one hydraulic connection closable by means of a separating valve, an electronic control and regulating unit, an electric circuit for actuating the separating valve independently of the electronic control and regulating unit as a function of the driver's deceleration demand, wherein the electric circuit includes an evaluating circuit for detecting the driver's deceleration demand that serves to enable the actuation of the separating valve, further including a hardware monitoring circuit connected downstream of the electronic control and regulating unit, whereby said monitoring circuit disables the actuation of the separating valve in the event that the electronic control and regulating unit produces a dynamic status signal signal which differs from a status signal produced by the hardware monitoring circuit.

7. Electro-hydraulic brake system for motor vehicles which is controllable in a 'brake-by-wire' operating mode by the vehicle operator as well as independently of the vehicle operator, and which can be operated in a back-up operational made where only operation by the vehicle operator is possible, comprising:

a device for detecting the driver's deceleration demand, an emergency pressure generator or, respectively, master brake cylinder that is operable by means of a brake pedal and has at least one pressure chamber, a travel simulator that cooperates with the master brake cylinder and can be disconnected by actuation of the master brake cylinder, a hydraulic auxiliary pressure source whose pressure is used to act upon wheel brakes that are connectable to the master brake cylinder by way of at least one hydraulic connection closable by means of a separating valve, an electronic control and regulating unit, an electric circuit for actuating the separating valve independently of the electronic control and regulating unit as a function of the driver's deceleration demand, wherein two actuation logic circuits are coupled to said separating valve, and wherein said two actuating logic circuits are associated with a safety switch and a separating valve driver connected in series with the separating valve.

* * * * *

UNITED STATES PATENT AND TRADEMARK OFFICE
CERTIFICATE OF CORRECTION

PATENT NO. : 6,817,681 B2
DATED : November 16, 2004
INVENTOR(S) : Fey et al.

It is certified that error appears in the above-identified patent and that said Letters Patent is hereby corrected as shown below:

Column 4,
Line 43, change "said tinier circuit" to -- said timer circuit --.
Line 51, change "status signal signal" to -- status signal --.

Column 5,
Line 22, change "status signal signal" to -- status signal --.

Column 6,
Line 1, change "made where only operation" to -- mode where only operation --.

Signed and Sealed this

Seventh Day of June, 2005

JON W. DUDAS
*Director of the United States Patent and Trademark Office*